United States Patent [19]
Campbell et al.

[11] Patent Number: 5,920,703
[45] Date of Patent: Jul. 6, 1999

[54] SYSTEMS AND METHODS FOR MANAGING THE PROCESSING OF RELATIVELY LARGE DATA OBJECTS IN A COMMUNICATIONS STACK

[75] Inventors: Scott Allan Campbell, Cary; Dale C. Gugliotta, Raleigh; Lynn Douglas Long, Chapel Hill, all of N.C.; Masashi E. Miyake, Poughkeepsie, N.Y.; Linwood Hugh Overby, Jr.; Bala Rajaraman, both of Raleigh, N.C.

[73] Assignee: International Business Machines Corp., Armonk, N.Y.

[21] Appl. No.: 08/802,597

[22] Filed: Feb. 19, 1997

[51] Int. Cl.$^6$ ...................................................... G06F 13/14
[52] U.S. Cl. ....................................................... 395/200.66
[58] Field of Search ....................... 364/DIG. 1 MS File, 364/DIG. 2 MS File; 395/200.3, 200.43, 200.44, 200.47, 200.48, 200.53, 200.61, 200.62, 200.66, 200.8

[56] References Cited

U.S. PATENT DOCUMENTS

| | | |
|---|---|---|
| 4,365,295 | 12/1982 | Katzman et al. . |
| 4,586,134 | 4/1986 | Norstedt . |
| 4,926,322 | 5/1990 | Stimac et al. . |
| 5,027,269 | 6/1991 | Grant et al. . |
| 5,269,013 | 12/1993 | Abramson et al. . |
| 5,278,834 | 1/1994 | Mazzola . |
| 5,297,265 | 3/1994 | Frank et al. . |
| 5,386,536 | 1/1995 | Courts et al. . |
| 5,396,614 | 3/1995 | Khalidi et al. . |

*Primary Examiner*—Robert B. Harrell
*Attorney, Agent, or Firm*—Jerry W. Herndon

[57] ABSTRACT

Management of the processing of relatively large data objects in a communications stack having multiple layers improves the performance in a communications system in preparing relatively large data objects for transmission across a communications network. This reduces or eliminates data movement and copying during segmentation of the relatively large data objects into relatively small data objects, and appendage of headers to the relatively small data object segments during processing in the communications stack. A shared storage manager creates and controls multiple tokens representing multiple images of portions of the relatively large data objects to enable separate scheduling of the multiple images from the same storage unit or buffer to be passed from one layer in a communications stack to the next lower layer in the communications stack. The large data object is segmented into a plurality of relatively small data object segments at one or more of the layers in the communications stack. When dictated by the communications stack, header segments are also created for each relatively small data object segment. Each header segment contains specific information for the relatively small data object segment to which the header corresponds. A separate buffer list is generated by the communications stack for each relatively small data object segment and for each corresponding header segment.

18 Claims, 9 Drawing Sheets

SYSTEMS AND METHODS FOR MANAGING THE PROCESSING OF RELATIVELY LARGE DATA OBJECTS IN A COMMUNICATIONS STACK

FIELD OF THE INVENTION

This invention relates to data communications, and more particularly, to sharing of data and transmission of data in a communications system.

BACKGROUND OF THE INVENTION

A communications system or network may be generally defined as a collection of computers or computing systems which interact and transmit data from one computer (i.e., node) on the network to another. The functional capabilities of the nodes may range from terminals with minimal local processing capability to complex multiprocessors capable of high speed local processing. A node incorporates a set of control functions required to ensure that network interfaces comply with networking standards or architectures. These control functions may be grouped into sets based on function. For example, in the Systems Network Architecture ("SNA") developed by International Business Machines Corporation ("IBM"), the assignee of the present invention, SNA defines a Physical Unit ("PU"), which controls operation of real network resources such as links, and a Logical Unit ("LU") which controls logical software based entities such as applications. Other networking architectures define similar functional groupings.

The communications facilities which interconnect the nodes also may vary, ranging from high speed input/output ("I/O") channels to low speed, point-to-point telephone lines. By way of example, the media used to implement the communications facilities may include satellite links or wide band optical fibers.

Referring to FIG. 1, a high level block diagram illustrating the components of an application-to-application communications network with two nodes, in this case, host computers, in a direct-attach environment is illustrated at 10. This type of view of the application-to-application communications network is sometimes referred to as an "end-to-end" view. The two host computers are illustrated at 12 and 14, respectively. The host computers, for example, may be IBM 390 Mainframe computers manufactured by International Business Machines Corporation ("IBM"), the assignee of the present invention. Each host computer has an "outbound" side 16 for sending data across the network and an "inbound" side 18 for receiving data transmitted across the network. In addition, applications execute on the host computers as illustrated at 20 and 22. Once an application has processed data and requests that data is to be sent to another node on the network, the data to be transmitted is then processed in the communications stacks 24 and 26 at the node on which the application is executing and transmitted via the system input/output ("I/O") interface 28. System I/O interface 28 also serves to assist in the receiving of data transmitted across the network.

By way of example, the present invention may also function in the communications network environment similar to that illustrated at 10' in FIG. 2. In the communications network illustrated in FIG. 2, two host computers are illustrated at 50 and 52. Host computer 50 as illustrated has the capability for managing relatively large data objects in a communications stack in accordance with the present invention. Computer 54 is a controller which simply is used as a router in the network for routing data which has been processed for transmission by host computer 50 across network 60. Applications execute on host computer 50 as illustrated at 62. Once an application has processed data and requests the data to be sent to another node on the network, the data to be transmitted is then processed in the communications stack 64.

Communications across a communications system such as that illustrated in FIG. 1 or 2 may be controlled by a network architecture. One network architecture which may be implemented on a communications system such as that illustrated in FIG. 1 or 2 is the Systems Network Architecture ("SNA") developed by IBM, the assignee of the present invention. SNA is a network architecture intended to allow users to construct their own private network on a communications system. An SNA network may be defined as a collection of machines or computers (i.e., nodes). There are several different types of nodes in an SNA network, including terminals, controllers that supervise the behavior of terminals and other peripherals, front-end processors which relieve the main central processing unit of the work and interrupt handling associated with data communications, and the main host computers. In essence, SNA specifies how nodes connect and communicate with one another. Moreover, SNA enables the system to share network resources by avoiding the necessity to install separate communication links for different types of workstations or dissimilar applications, and reducing the number of programs and devices.

The functions of the communications stack in an SNA network may be organized into several layers. Referring to FIG. 3, one manner of illustrating the hierarchial layers of SNA at a given node on a communications system implementing the SNA architecture (i.e., the communications stack) is shown generally at 100. Each node in the communications network operating under the SNA architecture generally has the same hierarchial software structure so as to enable communications between the nodes. In the illustration shown in FIG. 3, these layers of the communications stack include the physical control layer 102 which connects adjacent nodes physically and electrically for physically transporting bits from one machine to another, the data link control layer 104 which constructs frames from the raw bit stream for transmitting data between adjacent nodes and detecting and recovering from transmission errors in a way transparent to higher layers, the path control layer 106 (sometimes referred to as the network layer) which routes data between source and destination nodes and controls data traffic in the network, and the transmission control layer 108 (sometimes referred to as the transport layer) which creates, manages and deletes transport connections (i.e., sessions). The SNA layers also include the data flow control layer 110 (sometimes referred to as the session layer) which synchronizes data flow between end points of a session so as to establish and control a session between two end users for conversation purposes, the presentation services layer 112 which formats data for different presentation media and coordinates the sharing of resources, the transaction services layer 114 which provides application services such as distributed database access and document interchange, and finally, the network user or application layer 116 which relates to the conversation per se between two end users.

The physical control 102, data link control 104, path control 106 and transmission control 108 layers may be referred to as the "lower" layers 120 of the SNA model as it relates to the Open Systems Interface Reference Model ("OSI"). The data flow control 110, presentation services 112 and transaction services 114 layers may be referred to as the "upper" layers 122 of the architecture. Finally, the combination of the upper layers 122 and the lower layers 120 may be viewed as the communications stack 124.

The access methods which reside on the host processors provide a source of control for an SNA network. One such access method is the Virtual Telecommunications Access Method ("VTAM") which provides the interface between applications programs and a host processor and other resources in an SNA network. In essence, VTAM is a program that controls communication between terminals and application programs, and between applications, within the same or different SNA nodes. Communication between VTAM applications programs and the host and network terminals can generally occur only through VTAM. VTAM also monitors the performance of a network, identifies locations for potential problems, and assists in recovery from network failures. VTAM runs under the control of a virtual operating system such as the Multiple Virtual Storage ("MVS"), Virtual Machine/System Product ("VM/SP"), and Virtual Storage Extended ("VSE") operating systems. When operating in the MVS environment, VTAM enables independent SNA networks to communicate with each other.

VTAM application programs run under control of the operating system similar to any other programs. However, a VTAM applications program is generally connected to VTAM before it communicates with terminals or other applications in the network. A VTAM applications program uses VTAM macro instructions to communicate with terminals. An applications program within a host processor can be used at any location in the network without the program having any awareness of the organization of the network. VTAM provides the following major functions: starting and stopping the network; dynamically changing the configuration of the network; allocation of network resources; and control of input/output processing.

Referring to FIG. 4, the major components of a communications system 200 operating under VTAM including the host computer 202 containing VTAM 206 and VTAM applications programs 204 are illustrated. The host computer 202 is connected to secondary storage (i.e., auxiliary storage) 208 as well as the telecommunications network 210. The telecommunications network 210 may be divided into the SNA Terminal Environment 212 and Local 3270, BSC and Start/Stop Terminal Environment 214. In particular, the host computer is connected to the local computers and terminals such as a Local 3790 terminal 216 and a Local 3270 terminal 218. In addition, VTAM is also connected to the local communications controller 220 which may be referred to as NCP which in turn is connected to remote communications controllers 222, terminals on switched lines 224 and terminals on nonswitched lines 226.

The SNA network architecture and VTAM are described in detail in "Systems Network Architecture," Concepts and Products, IBM, GC30-3072-3, "VTAM Concepts," Independent Study Program, IBM, 1982; and Chapter 1 of the textbook entitled "Computer Networks" by Tanenbaum, Prentice Hall, Inc. (2d ed., 1988), all of which are incorporated herein by reference. VTAM also is described in detail in U.S. Pat. No. 4,586,134 entitled "Computer Network Systems and Its Use for Information Unit Transmission" and U.S. Pat. No. 5,027,269 entitled "Method and Apparatus for Providing Continuous Availability of Applications in a Computer Network," both of which are also incorporated herein by reference.

The movement of data in most communications systems can have a severe impact on the efficiency of the system. As the number and frequency of data transmissions increase, the utilization of components, such as a memory bus and central processing unit, of a processor significantly increase. The total throughput supported by the communications system may be severely limited when the inefficient use of a component causes the utilization of that component to reach maximum capacity.

Notwithstanding the effect of data transmissions on system performance, the current trend is towards transmission of large data objects. This occurs particularly in applications relating to multimedia, image and large file applications processing. Once an application designates a relatively large data object to be transmitted to another node in the communications system, the relatively large data object is processed through the communications stack in preparation for transmission across the communications network. During processing of the relatively large data object in the communications stack from the transaction services layer 114 through the physical control layer 102 (see FIG. 3), the relatively large data object may need to be segmented into smaller data objects due to network restrictions on maximum transmission sizes. In addition, headers that contain protocol specific information may be added at the different layers of the communications stack to the relatively large data object and/or to the newly created segments of the relatively large data object.

Typically during processing of a large data object at a given layer in the communications stack, an additional storage unit or buffer is allocated, the newly segmented data object is stored in the new storage unit, a segment header may be created, and the new data segment is transmitted contiguously with the header to the next lower layer in the communications stack. This generally requires that each newly created segment, i.e., portion of the large data object, be copied into a newly obtained storage unit, and the header associated with the new segment be put in front of the corresponding new segment. Each newly created header and associated data segment are passed contiguously to the next layer in the communications stack separate and apart from other header and data segment combinations. Thus, new storage areas, and copying of data and headers into the new storage areas, may be required as a result of the segmentation of data and creation of headers during processing in the communications stack. As a result, numerous data movements may occur, which may severely impact the performance level in the communications stack and the communications system.

In order to improve the performance of applications, such as multimedia applications, which process and transmit large data objects between nodes in a communications system, data movement and copying during processing in the communications stack should be eliminated, or at least significantly reduced. This may be addressed by addressing several problems in a communications protocol implementation, including storage ownership, resource sharing and header management.

Thus, the prior art may require the communications stack to get new storage units or buffers during processing without regard to the size of the data segment and headers. This, however, may result in not only excessive waste of storage since the segment sizes may bear no relationship to the overall size of the relatively large data object, but also may severely impact the performance in the communications stack due to the numerous data copies and movements.

One alternative is for the application to reserve space in the original storage area for storage of the headers as they are created. However, this may tie the creation of the data image to the communications protocol being implemented. Moreover, different communications protocols may require different length headers. In addition, variable length headers may even be required within the same communications protocol. As a result of the potential variability in the header length, prior reservation of storage space in the original storage area for the header at the time the data image is created may be difficult.

Another alternative approach previously used in an attempt to improve the efficiency of processing within the communications stack requires having prior knowledge of segment size requirements within the communications stack. As a result, when segmentation occurs, buffers having the same size as the newly created data segments are used. For example, if the relatively large data object has 60K bytes, and the communications network constraints provide that a maximum transmission size for data objects is 4K bytes, buffers are reserved which have a size of 4K bytes so that the buffer size matches the data segment size.

These prior art alternatives may still fall short of solving the data copy and movement problem during processing within communications stacks. For example, the prior art methods may require the allocation of a greater number of small buffers. Consequently, the allocation of a larger number of buffers to house a large data object of a given size may result in a negative impact on performance in the communications stack. In addition, the prior art methods which utilize knowledge of the segment size at the upper layers of the communications stack may require information relating to communications stack segment size constraints to be forced up the communications stack to the upper layers when such information is generally known only by the lower layers in the communications stack (i.e., by the transmission control 108, path control 106, data link control 104 and physical control 102 layers (see FIG. 3)). Finally, in order to entirely eliminate the movement of data at the application layer 26, the knowledge relating to segment size must be forced to the top layer in the communications stack, namely, the applications layer 116 (see FIG. 3).

SUMMARY OF THE INVENTION

It is, therefore, an object of the present invention to provide methods, systems and computer program products for managing the processing of relatively large data objects in a communications stack having multiple layers in a communications system for improving the performance of a communications system.

It is another object of the present invention to provide methods, systems and computer program products for passing relatively large data objects between layers in a communications stack otherwise requiring segmentation of the relatively large data objects into relatively small data objects and appendage of headers to the relatively small data object segments.

These and other objects are provided according to the present invention by a system for improving the performance in a communications system relating to the transmission of large data objects between nodes, and in particular, by a system for improving the performance of processing of relatively large data objects in a multi-layered communications stack prior to the relatively large data object being transmitted across a channel of the communications system.

Managing the processing of relatively large data objects in a communications stack having multiple layers is accomplished by providing a shared storage manager which creates and controls multiple tokens representing multiple images of portions of the relatively large data objects. The communications stack separately schedules the multiple images from the same storage unit or buffer for passing from one layer in a communications stack to the next lower layer in the communications stack. For example, assuming that the relatively large data block has a size of 60K bytes and the communications network has a maximum segment size limit of 4K bytes per segment, the communications stack segments the data as necessary by invoking the storage manager which generates a secondary token for each 4K byte segment. The communications stack then separately schedules each 4K byte segment for passing to the next lower layer in the communications stack.

The present invention stems from the understanding that a relatively large data object may need to be segmented into smaller data objects due to network limitations on maximum transmission sizes as the relatively large data object is processed through the communications stack. In addition, it is also understood that headers containing protocol specific information may be added to the relatively large data object and/or to the segments of the relatively large data object at different layers in the communications stack. Still further, it is understood that this creation of segments and the addition of headers using prior art alternatives requires that the data segments be appended in some manner to the corresponding header and, in order to pass the header and data segment to the next lower layer in a communications stack, movement and/or copying of each header and data segment is required. If the movement and/or copying of the header and data segments can be eliminated, performance can be enhanced.

Thus, management of processing in a communications stack according to the present invention controls the processing of relatively large data objects as the data objects proceed through the layers of a communications stack which requires segmentation of the relatively large data objects as well as creation of headers containing protocol specific information for each newly created data segment. Management according to the present invention begins with the receipt by the communications stack of a relatively large data object designated to be transmitted across the network by an application. The large data object is segmented into a plurality of relatively small data objects at one or more of the layers in the communications stack. Segmentation is required due to the maximum size limit set by the communications network for transmitting data across the network. Segmentation of the relatively large data object into a plurality of relatively small data objects occurs when necessary without the need to physically move the large data object or to make copies of the large data object or portions thereof.

When dictated by the communications stack, headers are created for each segment containing the relatively small data object. Each header contains protocol specific information for the relatively small data object segment to which the header corresponds. In addition, each header is uniquely associated with one small data object segment without physically moving the small data object segment and without creating a copy of either the large data object or the small data object segment. Each header and its corresponding small data object segment is discontiguously passed from one layer to the next layer in the communications stack without requiring physical movement of the small data object segment and its associated header, and without requiring creation of a copy of the small data object segment and its associated header.

The discontiguous passing of each header and its associated data segment is accomplished by the use of a buffer list and tokens. A primary token representing the relatively large data object is generated by the storage manager, and stored in a buffer list. A secondary token representing a logical image of each relatively small data object segment is also generated by the storage manager, each secondary token being uniquely associated with a corresponding small data object segment, and stored in a separate buffer list. A buffer list contains a series of buffer list entries which are used for each separately managed or discontiguous area of storage referenced by the buffer list. A separate buffer list is maintained for each small data object segment. The buffer list which corresponds to a particular small data object segment and contains the uniquely associated secondary token, also references the header containing protocol specific information which also is uniquely associated with the small data object segment. The tokens are used to represent the data objects. The tokens are not physical addresses, but rather serve to identify the buffer containing the relatively large data object and the images of "portions" of the large data object (i.e., the small data object segments). As a result, the storage manager and the communications stack can refer to the large data object and the small data object segments through use of the token as opposed to the physical address of the data and/or the headers.

Once the buffer list contains the primary token or the secondary token uniquely associated with a particular small data object segment, and the header pointer uniquely referencing the header which is uniquely associated with the particular small data object segment, the buffer list is transferred from the current layer in the communications stack to the next layer in the communications stack. As a result, the small data objects are passed from the current layer to the next layer in the communications stack discontiguously from the associated header and without requiring physical movement or copying of the small data object or its associated header. The process is continued at each layer in the communications stack which requires segmentation or the addition of headers until the large data object, or portions thereof, reaches the path control layer.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 5:
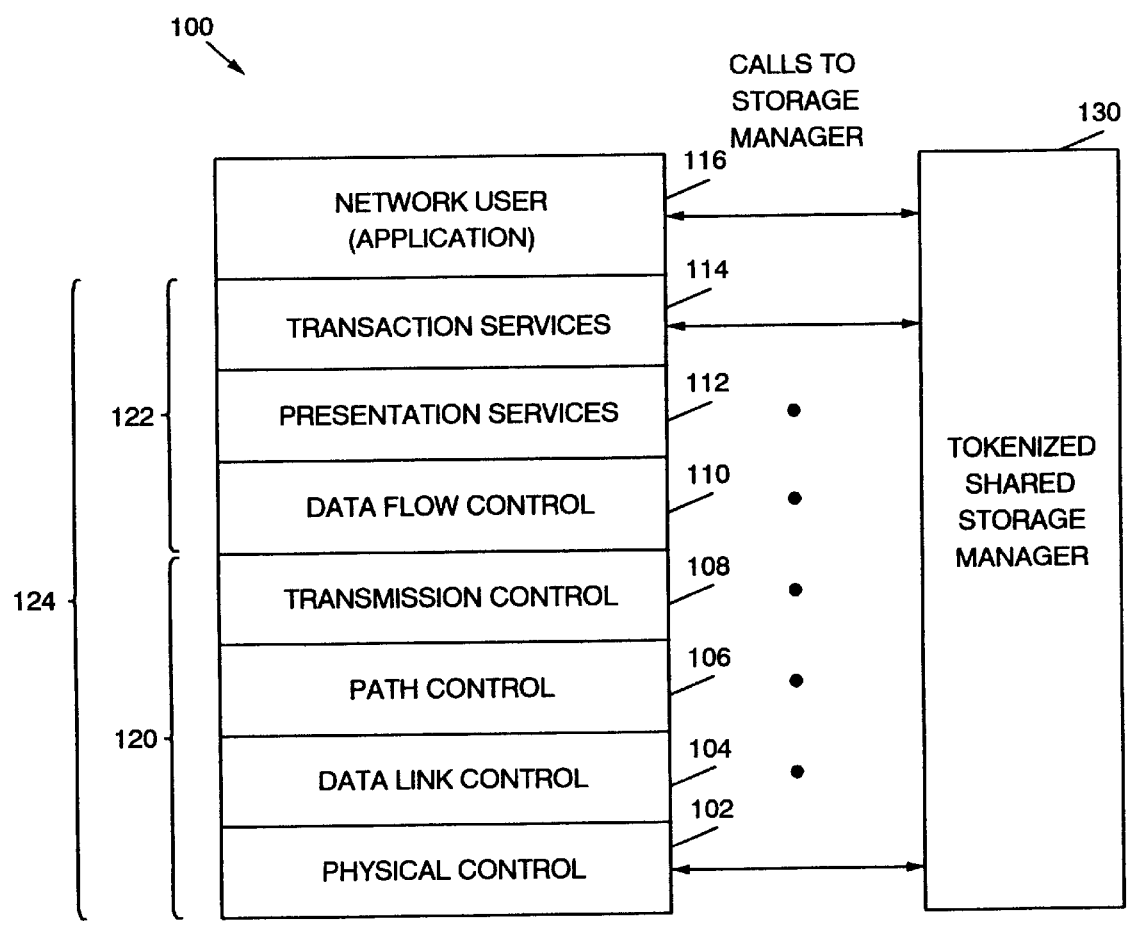
FIG. 5 is a schematic block diagram illustrating the network protocol layers of a communications stack from a computer software perspective for the SNA architecture in communications with the tokenized shared storage manager according to the present invention.

The invention is described in an environment which is substantially based upon the IBM SNA architecture and VTAM access method. In the SNA architecture environment, each layer 102–116 of the SNA network communicates directly with the tokenized shared storage manager 130 of the present invention as illustrated generally at 100' in FIG. 5. The management of processing of relatively large data objects in a communications stack according to the present invention takes place between the applications layer 116 and the path control layer 106 (see FIG. 5). Notwithstanding the above, the present invention is applicable to any type of network or network architecture which requires segmentation of relatively large data objects and/or the appendage of headers containing protocol specific information to each data segment as the large data object proceeds through the layers of the communications stack.

FIGS. 6–9 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Figure 6:
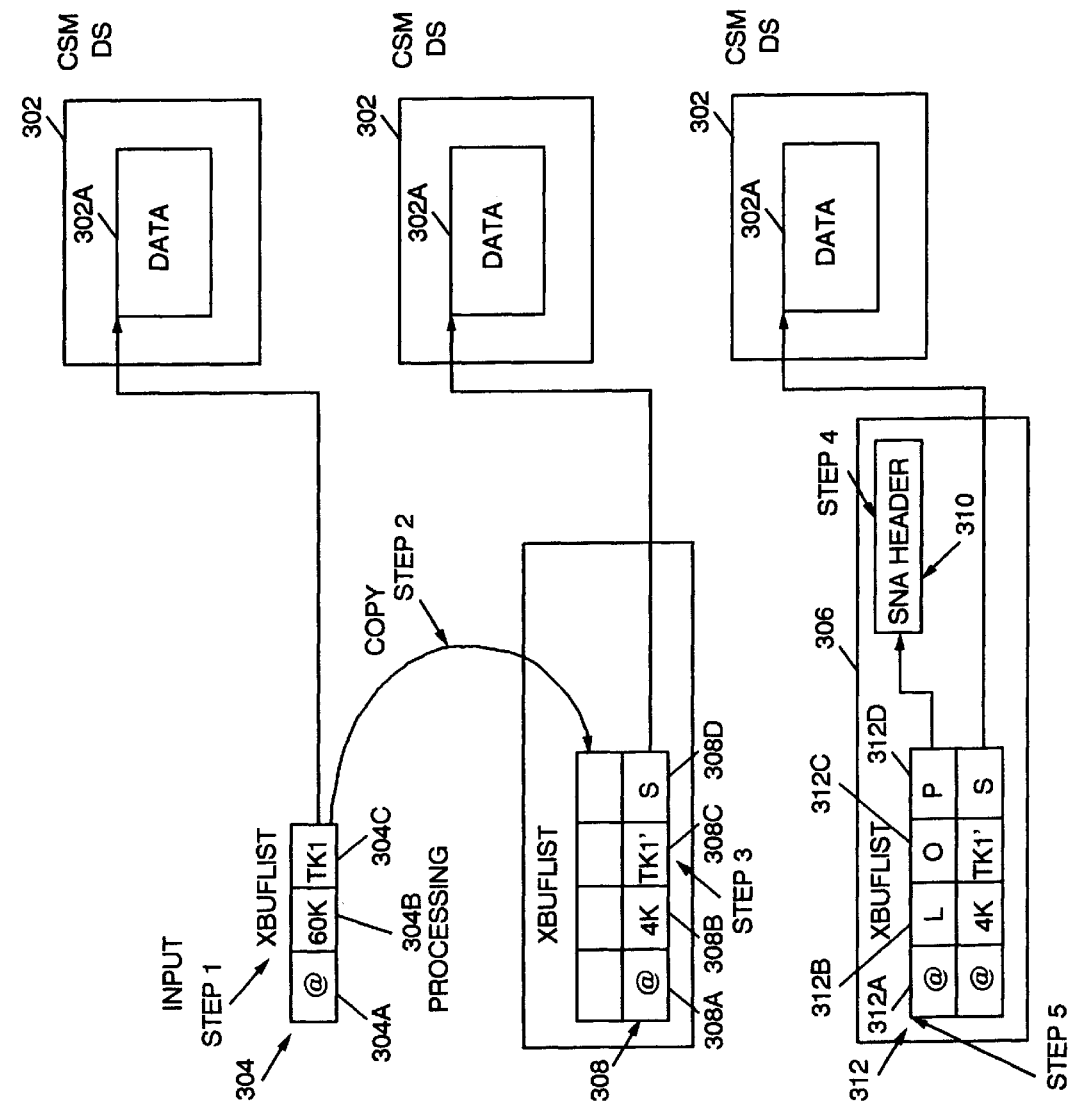
FIG. 6 is a block diagram illustrating the management of processing of a relatively large data object at one layer in a communications stack, including the use of a buffer list in the segmentation and header generation process.

Referring to FIG. 6, a block diagram illustrating the management of the processing of relatively large data objects as they proceed through the communications stack is illustrated. In particular, FIG. 6 illustrates the building of the buffer list, segmentation of the data and generation of a header containing protocol specific information for each segment of relatively small data objects.

FIG. 6 illustrates the data storage area maintained by the storage manager at 302, i.e., the "CSM DS" or the communications storage manager data storage. The data storage area illustrated at 302 contains shared memory buffers allocated by the storage manager. At Step 1 of FIG. 6 illustrated generally at 304, the application requests a block of storage from the storage manager. The storage manager reserves a block of storage for the application as illustrated at 302a and generates a primary token referencing the buffer at 302a to the application. The application then generates the buffer list entry for the allocated buffer at 304. The application builds the buffer list entry at 304 by storing the address of the buffer or an offset into the buffer at 304a, the length of the block of data (e.g., 60K) stored in the buffer at 304b and the primary token, designated as "TK1" in this example, at 304c.

The application layer then notifies the communications stack that the data stored in buffer 302a is to be transmitted across the communications network to another node. As a result, the communications stack begins processing at Step 2 using the communications stack storage 306 which is not necessarily the same as the storage manager storage identified at 302. The communications stack storage 306 may be referred to as "internal storage." At Step 2, the communications stack copies the buffer list 304 from the application into the communications stack storage 306 as illustrated at 308, and reserves the buffer list entry for the header to be built at Step 5.

Keeping in mind that a separate buffer list is maintained for the original relatively large data object and for each relatively small data object segments, the communications stack builds a buffer list 308 in its own communications stack storage 306 for each small data object segment at Step 3. Similar to the buffer list for the large data object, the buffer list for each small data object contains an address to the buffer at 308a, which happens to be the address for the same buffer used to store the large data object or an offset into the buffer in which the large data object is stored. In addition, the length of the small data object segment stored in the buffer 302a is also stored in the buffer list for the small data object segment at 308b. If the large data object was segmented, then the secondary token TK1' created by the storage manager is stored in the buffer list at 308c. Otherwise, if the data was not segmented, the primary token TK1 will be stored in the buffer list at 308c. Finally, if a small data object segment was created, then the segment is designated as "static" and an indication, e.g., "S," that the segment has been designated as "static" is stored in the buffer list at 308d. "Static" indicates that the segment is a data segment. The small data object segment may also be designated as "primal," e.g., "P." "Primal" indicates that a buffer list refers to a header. "Static" and "primal" are fully described in U.S. patent application Ser. No. 08/802,598 filed concurrently with the present application and entitled "Systems and Methods for Transmitting and Receiving Data in Connection With a Communications Stack in a Communications System," which is assigned to IBM, the assignee of the present invention, and incorporated herein by reference.

Still referring to FIG. 6, the communications stack then proceeds to generate the SNA Header at Step 4 as indicated generally at 310 for the data segment created during processing by the communications stack at the current layer. Header 310 contains protocol specific information. Protocol specific information may include, for example, a destination address, control bits and other administrative control data. In addition, at Step 5 which is illustrated at 312 generally, the communications stack generates a buffer list entry for header 310. The buffer list entry for header 310 includes, like the other buffer list entries, an address at 312a for the location in which header 310 is stored in the internal communications stack storage 306. In addition, the communications stack stores the length of header 310 at 312b of the buffer list entry and places a zero at 312c of the buffer list entry indicating that there is no token for this buffer list entry. Finally, the communications stack indicates that header 310 is "primal," e.g., "P," at 312d of the buffer list entry in the communications stack storage.

Once the buffer list is built, one buffer list entry references the header for the small data object segment at 310 and the other buffer list entry references the small data object segment stored in the storage units at 302a. Separate buffer lists 308 for the data segment and 312 for the header segment are created for each data segment which is created during processing in the communications stack. This process continues until the large data object is segmented into relatively small data objects that are of a sufficiently small size to meet the maximum segment size limits required by the communications network and the data has passed through to the path control layer 106 of the communications stack (see FIG. 5).

Figure 1:
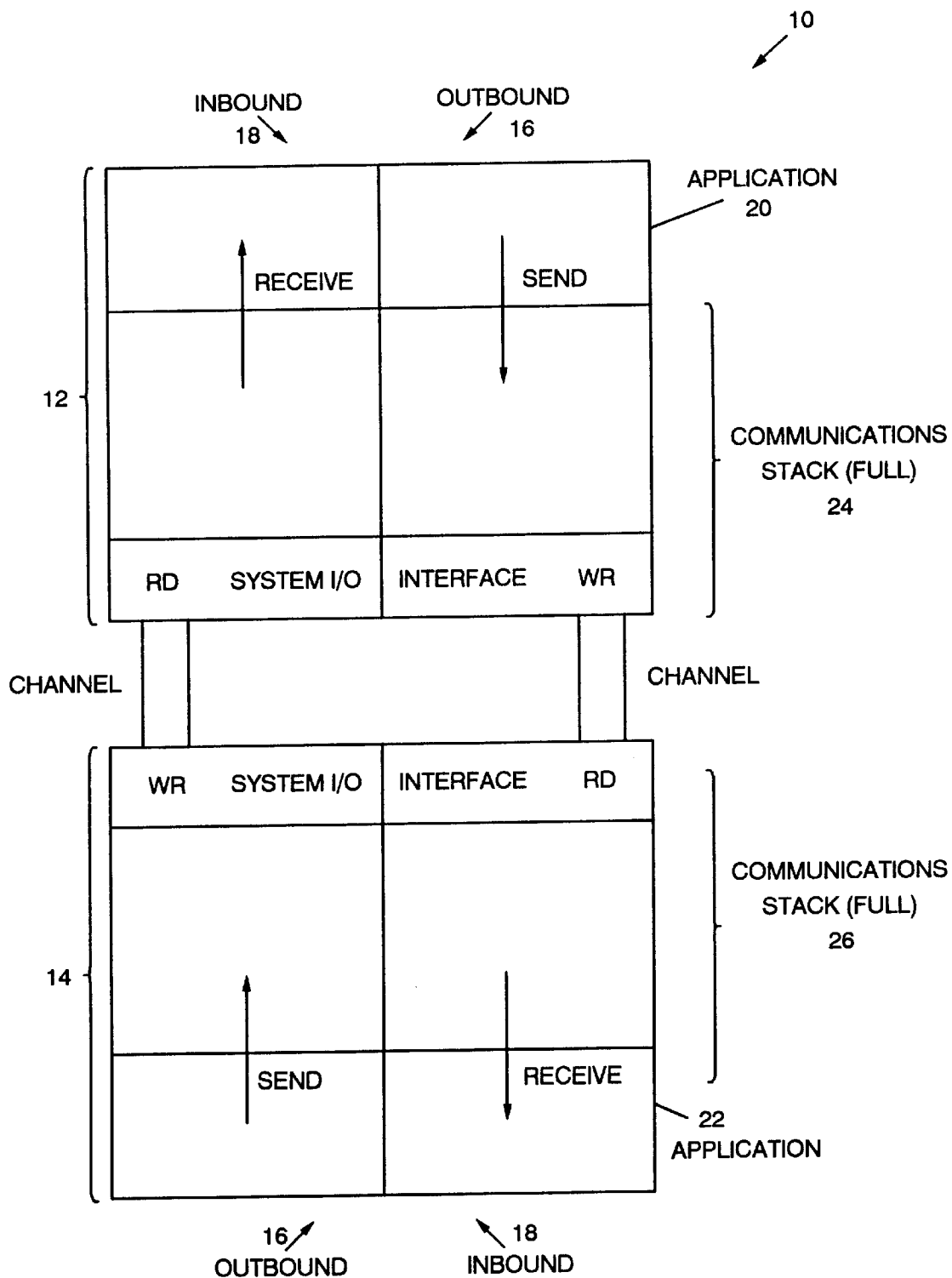
FIG. 1 is a block diagram of an application-to-application communications network with two host computers in a direct-attached environment.
Figure 2:
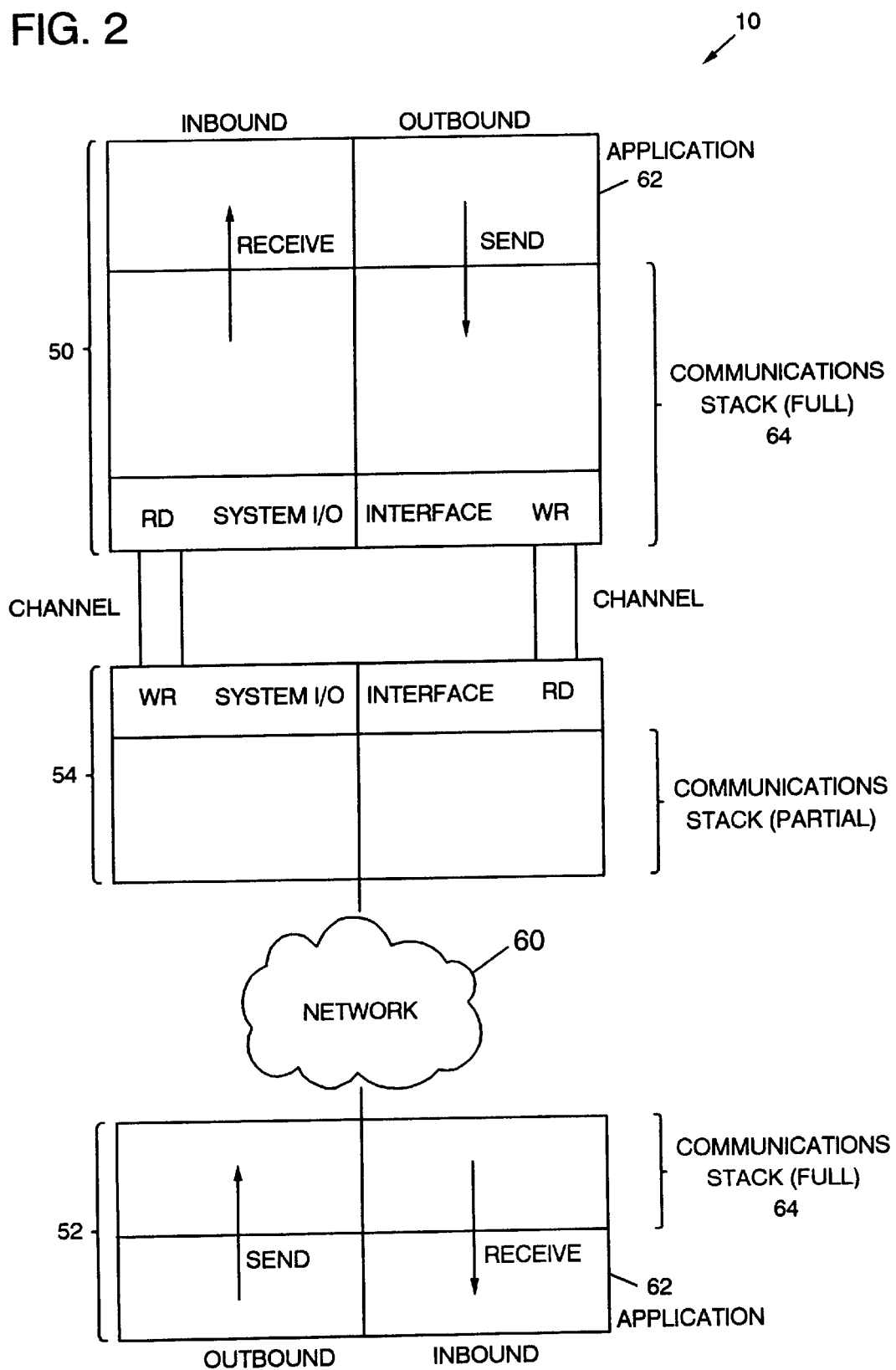
FIG. 2 is a block diagram illustrating the components of an application-to-application communications network with two host computers and a network controller.
Figure 3:
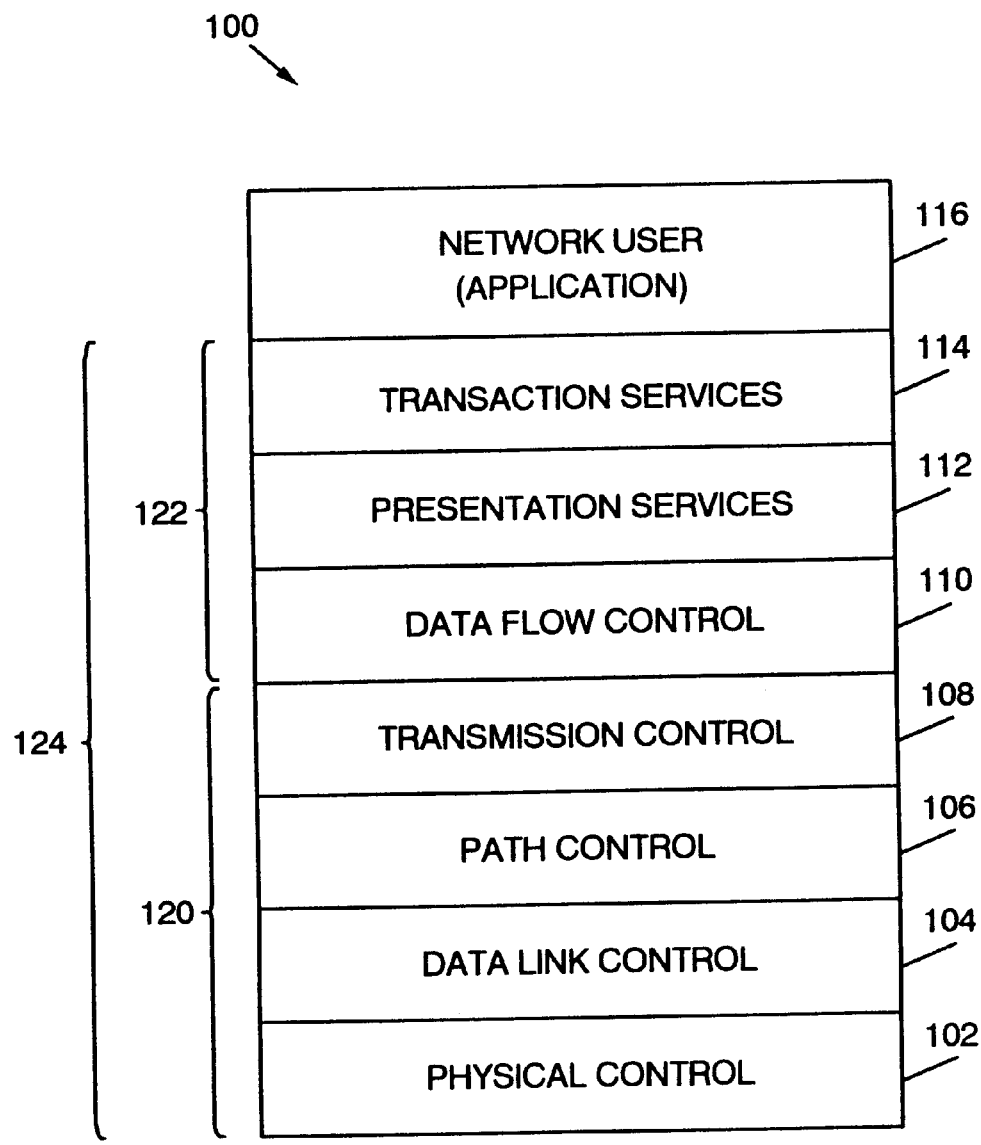
FIG. 3 is a schematic block diagram illustrating the network protocol layers of a communications stack from a computer software perspective for the System Network Architecture implementation of a communications system at a particular node on an application-to-application communications network such as that illustrated in FIG. 1.
Figure 4:
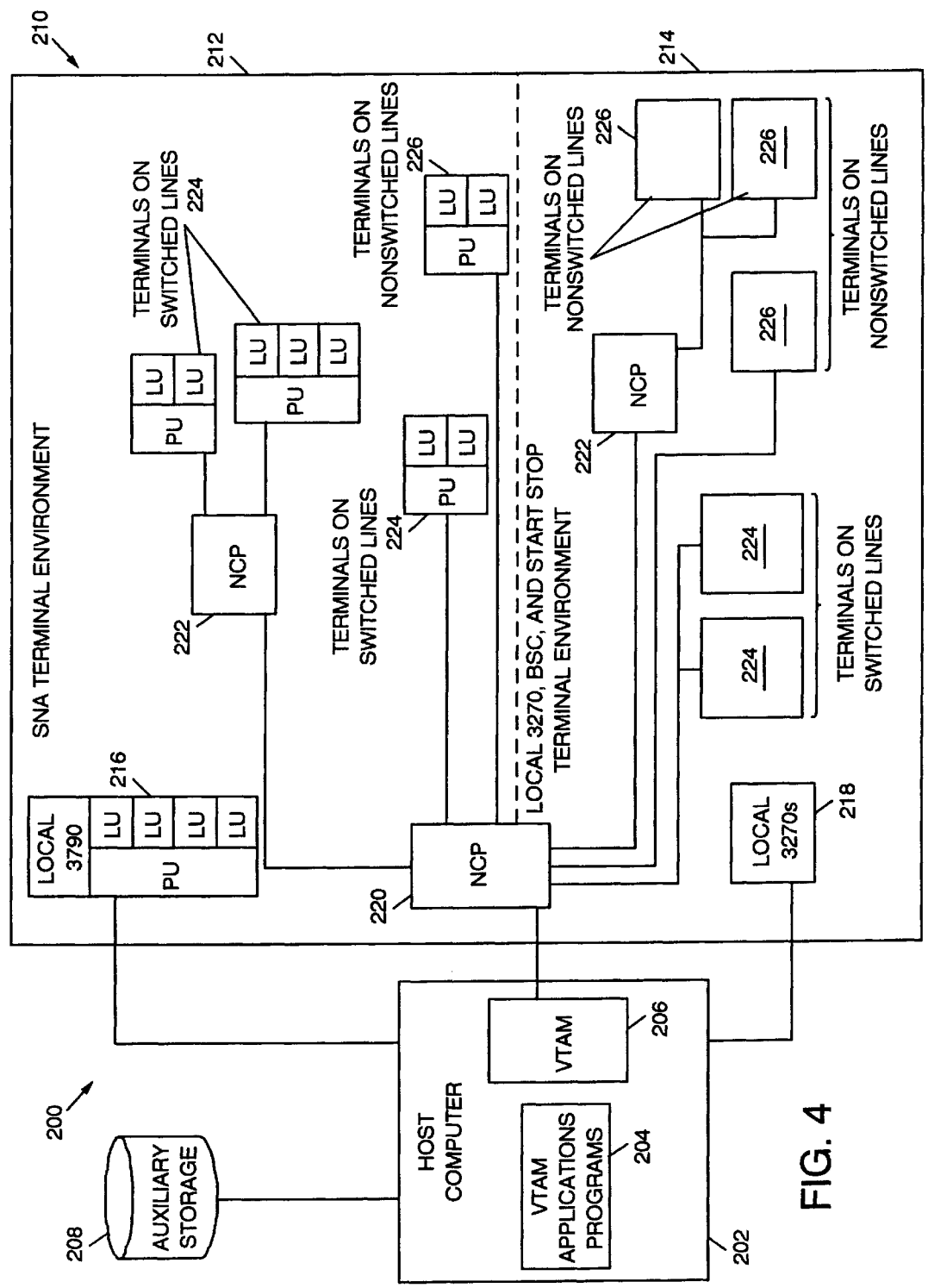
FIG. 4 is a block diagram of the major components of a VTAM system for a communications system capable of implementing the SNA architecture illustrated in FIG. 3.
Figure 7:
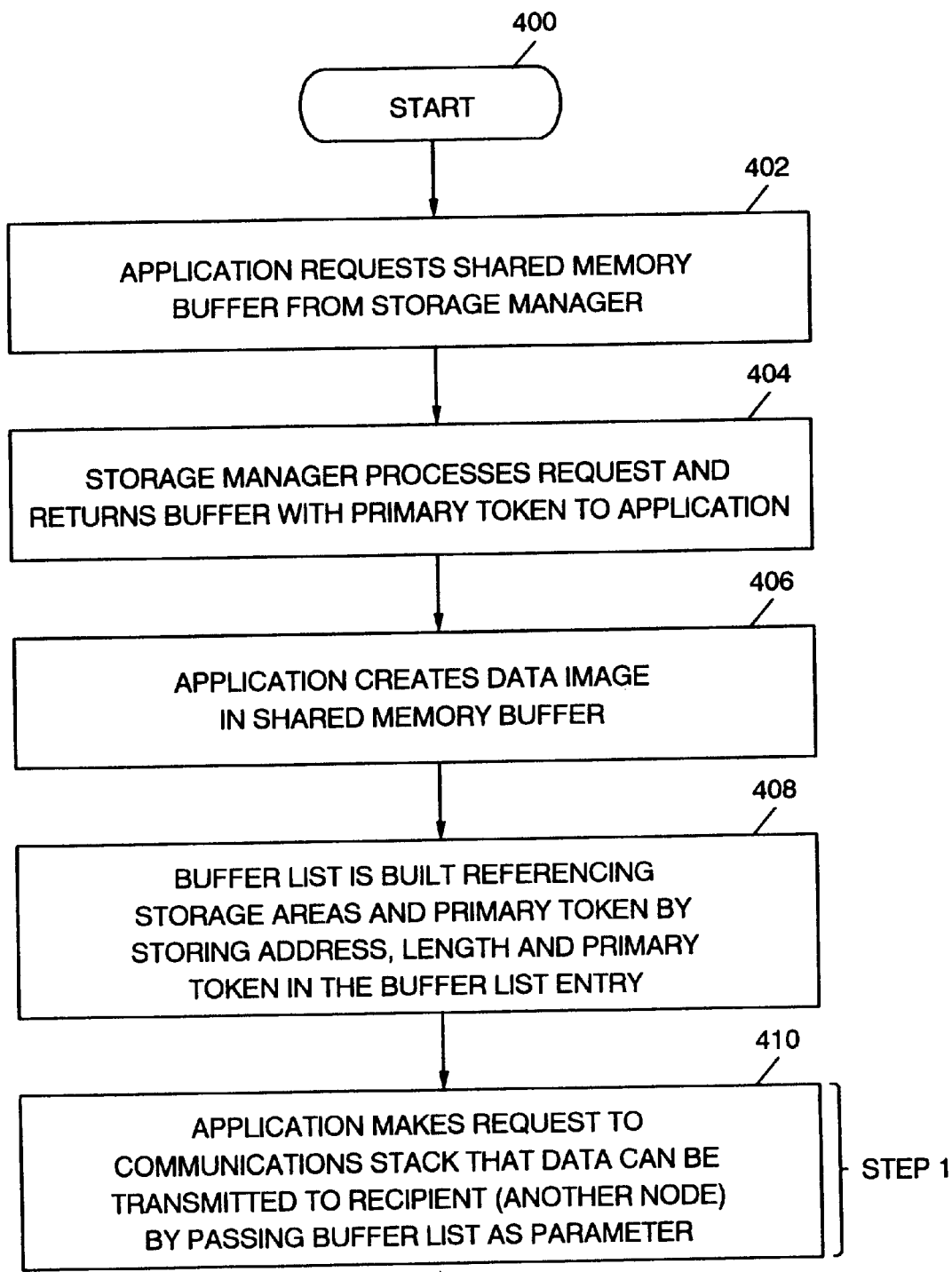
FIG. 7 is a flowchart representation illustrating the operations relating to the management of the processing of a relatively large data object by an application prior to processing of the data for transmission across the network by the communications stack.

Referring to FIG. 7, a flowchart of the operations relating to the processing by the application preparing data to be sent to the communications stack is illustrated. In summary, FIG. 7 illustrates the processing of the relatively large data object by the application and the storage manager just prior to processing by the communications stack between the transaction services layer 114 and the path control layer 106 (see FIG. 3). The application begins processing at 400 in FIG. 7, and requests a shared memory buffer from the storage manager at 402 for the relatively large data object. The storage manager processes the application's request for the shared memory buffer and generates a primary token referencing the shared memory buffer at 404. The storage manager then returns the shared memory buffer with the primary token to the application. The application then creates the data image in the shared memory buffer at 406.

Still referring to FIG. 7, the application builds the buffer list at 408. This task is performed by storing the address of the buffer, the length of the relatively large data object stored in the buffer and the primary token in the buffer list entry at 408. Thereafter, the application notifies the communications stack that it is requesting that the relatively large data object be transmitted to another node in the communications network, and passes the buffer list as a parameter to the communications stack at 410. Step 410 relating to the notification to the communications stack that a relatively large data object is to be transmitted to another node on the communications network and the passing of the buffer list to the communications stack corresponds to Step 1 of FIG. 6.

Figure 8:
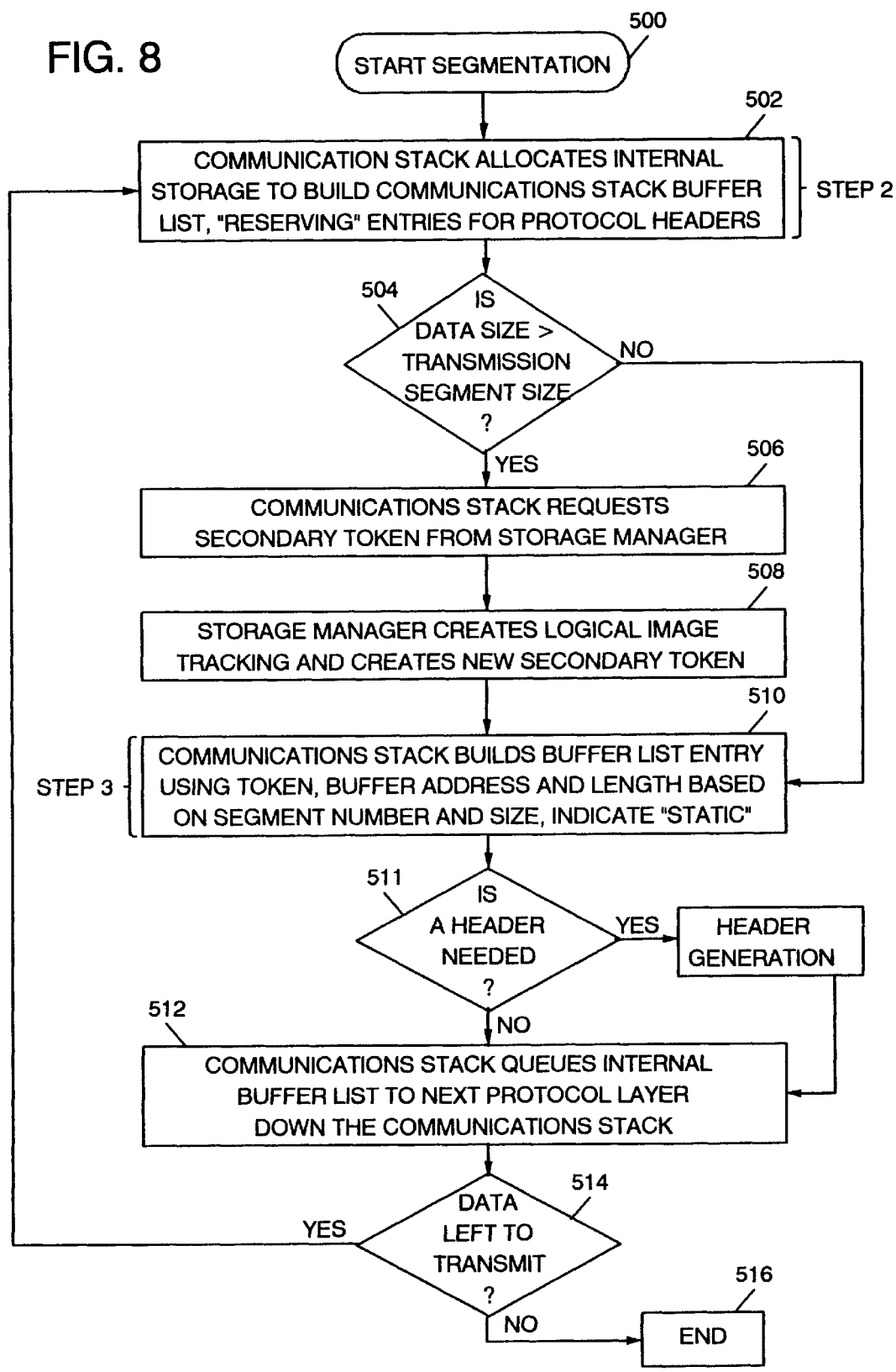
FIG. 8 is a flowchart representation illustrating the operations relating to management of the processing of the relatively large data object as it proceeds through the layers of the communications stack, and in particular, the segmentation of the relatively large data objects into multiple small data segments during processing by the communications stack according to the present invention.

Referring to FIG. 8, a flowchart illustrating operation of communications stack segmentation will now be described. The segmentation process is started at 500 upon receipt by the communications stack of the notification that data is to be transmitted across the communications network and the receipt of the buffer list as a parameter from the application at 410 of FIG. 7. Thereafter, the communications stack allocates storage internal to the communications stack for building the communications stack buffer list at 502, thereby reserving entries for the protocol headers. Step 502 of the segmentation process corresponds to Step 2 of FIG. 6.

A determination is then made at 504 as to whether the size of the data object is greater than the maximum data segment transmission size permitted by the communications network. If it is determined at 504 that the size of the relatively large data object is greater than the maximum segment size permitted by the communications network, the communications stack requests a secondary token from the storage manager at 506. In response, the storage manager creates a logical image of the data object by creating a new secondary token referencing the portion of the relatively large data object at 508. Thereafter, the communications stack builds a buffer list for the newly created segment or logical image at 510. The communications stack builds the buffer list by storing the address to the original buffer containing the relatively large data object and any necessary offset to the segment within the buffer, the length of the new data segment based on the segment number and the size, the newly created secondary token, and an indicator that the newly created segment is "static," i.e., that the segment referenced by the buffer list is a data segment. Step 510 of FIG. 8 corresponds to Step 3 of FIG. 6.

If it was determined at 504 that the size of the data left in the original buffer containing the relatively large data object to be transmitted is not greater than the maximum segment size permitted by the communications network, control is transferred to 510. If control is received at 510 directly from 504 indicating that this is the last segment to be processed at the current layer of the communications stack, the token which is stored in the buffer list being built at the current layer by the communications stack at 510 is the primary token, and processing continues at 510 as described above.

A determination is then made at 511 as to whether a header is needed for the small data object segment. If it is determined that a header segment is required, control is transferred to Header Generation which will be described with reference to FIG. 9. Once Header Generation is completed (if required), the communications stack queues the buffer list to the next layer in the communications stack at 512. A determination is then made at 514 as to whether any data in the original buffer containing the relatively large data object remains to be transmitted across the communications network. If no data is left to transmit, processing of the data to be transmitted at the current layer of the communications stack is complete as indicated by the "End" at 516. Otherwise, control is returned to 502 for allocation of internal storage for the building of another buffer list during the segmentation process at the current layer of the communications stack.

Figure 9:
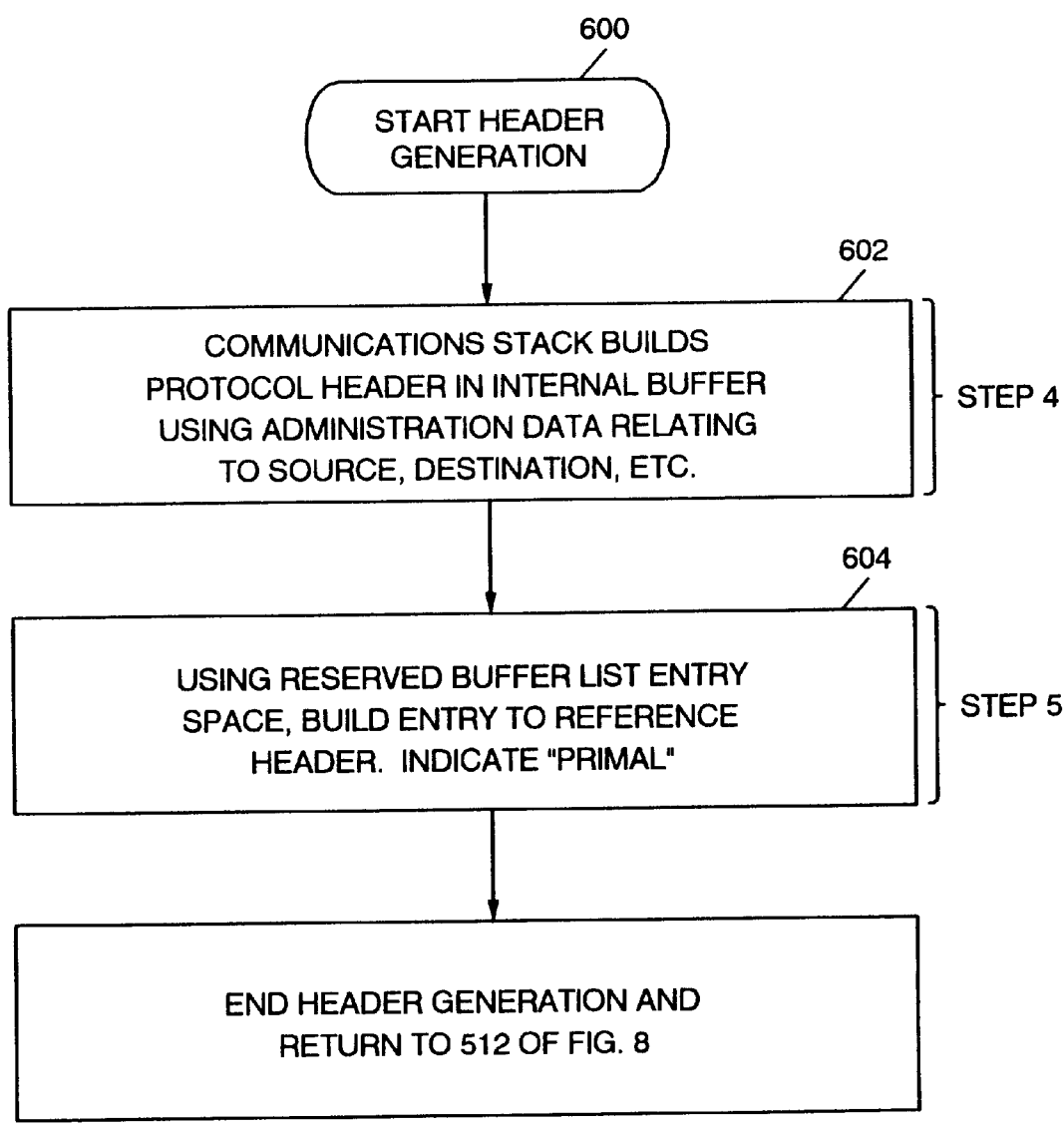
FIG. 9 is a flowchart representation illustrating the operations relating to management of the processing of a relatively large data object through the layers of a communications stack, and in particular, the creation of headers for small data segments and management of the headers, according to the present invention.

Referring to FIG. 9, a flowchart illustrating the operation of header generation will now be described. Header generation is started at 600, and the communications stack builds a protocol header for the newly created small data object segment and stores the protocol header in the internal communications stack storage space at 602. A separate header segment is built for each data segment. The protocol header segment is built by the communications stack using administration data relating to the source of the segment, the destination of the segment and other administrative data. Step 602 of header generation corresponds to Step 4 of FIG. 6. Thereafter, the communications stack builds the buffer list entry for the header at 604. The buffer list entry for the header is built by storing the address and any necessary offset to the address for the header segment, the length of the header, and an indication that the header is "primal" in the buffer list corresponding to the header. Step 604 of header generation corresponds to Step 5 of FIG. 6. Upon completion of building of the header and the buffer list entry for the header, control is returned to block 512 of FIG. 8 for further processing.

Each newly created relatively small segment of the relatively large data object that is queued to the next layer of the communications stack may in turn be further segmented at the next layer using the segmentation process of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim:

1. A method for managing processing of relatively large data objects in a communications stack having multiple layers, said communications stack generally requiring segmentation of the relatively large data objects as the large data objects proceed through the layers of said communications stack and appendage of headers containing protocol specific information to each segment of data, said method comprising the steps of:

receiving a relatively large data object from an application for processing in said communications stack;

segmenting said relatively large data object into a plurality of relatively small data objects without physically moving the relatively large data object and without creating a copy of the large data object;

generating a header containing protocol specific information for each segment of relatively small data objects such that each header is uniquely associated with one segment of small data objects, without physically moving the small data object, without creating a copy of the large data object, and without creating a copy of the associated small data object; and discontiguously passing said plurality of relatively small data objects and said plurality of associated headers from one layer in said communications stack to a second layer in said communications stack, whereby each of said plurality of small data objects is passed to said second layer in said communications stack discontiguously from its associated header and without physically moving any of the small data objects and its associated header and without creating a copy of any of the small data objects and its associated header;

whereby said headers are added at different layers in the communications stack without physically moving any of the large data objects, the small data objects and the associated headers and without creating a copy of any of the large data objects, small data objects and associated headers.

2. A method for managing processing of relatively large data objects in a communications stack according to claim 1 wherein the discontiguously passing step comprises the steps of:

generating a buffer list for each small data object segment created by said segmenting step, said buffer list uniquely associated with a small data object segment and the header corresponding to the small data object segment; and passing each buffer list from one layer in said communications stack to a second layer in said communications stack, whereby each of said plurality of small data objects is passed to said second layer in said communications stack discontiguously from its associated header and without physically moving any of the small data objects and its associated header and without creating a copy of any of the small data objects and its associated header.

3. A method for managing processing of relatively large data objects in a communications stack according to claim 2 wherein said generating a buffer list step comprises the steps of:

generating a primary token for representing the relatively large data object, said primary token being uniquely associated with the corresponding large data object;

generating a secondary token for representing a logical image of each small data object segment, each secondary token being uniquely associated with a corresponding small data object segment;

generating a header pointer for referencing a header associated with a particular small data object segment, each header pointer uniquely referencing the header corresponding to the particular small data object segment;

storing the primary token in each separate buffer list;

storing each secondary token in a separate buffer list, each buffer list corresponding to the same small data object segment to which the secondary token corresponds; and storing each header pointer in a separate buffer list having the secondary token stored therein which corresponds to the same small data object segment to which the header uniquely referenced by the header pointer corresponds.

4. A method for managing processing of relatively large data objects in a communications stack according to claim 1 wherein the receiving step comprises the step of receiving the relatively large data object from an application processing in said communications stack without receiving any information relating to the relationship between the relatively large data object and segmentation requirements of the communications stack.

5. A method for managing processing of relatively large data objects in a communications stack according to claim 1 further comprising the steps of:

discontiguously receiving the plurality of small data object segments at the second layer in said communications stack;

segmenting each of said received small data object segments into a plurality of smaller data object segments without physically moving the received small data object segments and without creating a copy of the received small data object segments, each smaller data object segment being relatively smaller in size than the received small data object segment from which it was segmented;

generating a smaller data object header containing protocol specific information for each smaller data object segment such that each smaller data object header is uniquely associated with one smaller data object segment, without physically moving the smaller data object segment and with creating a copy of the smaller data object segment; and discontiguously passing said plurality of smaller data object segments and said plurality of associated smaller data object headers from the second layer in said communications stack to a third layer in said communications stack, whereby each of said plurality of smaller data object segments is passed to said third layer in said communications stack discontiguously from its associated smaller data object header and without physically moving any of the smaller data object segments and its associated smaller data object header and without creating a copy of any of the smaller data object segments and its associated smaller data object header.

6. A method for managing processing of relatively large data objects according to claim 1 wherein said communications stack is a communications stack implemented in a virtual telecommunications access method (VTAM) system.

7. A system for managing processing of a relatively large data object in a communications stack having multiple layers, said communications stack generally requiring segmentation of the relatively large data object as the large data object proceeds through the layers of said communications stack and appendage of headers containing protocol specific information to each segment of data, said system comprising:

means for segmenting said relatively large data object into a plurality of relatively small data objects without requiring physical movement of the relatively large data object and without requiring creation of a copy of the large data object;

means for generating a header containing protocol specific information for each segment of relatively small data objects without requiring physical movement of the small data object, without requiring creation of a copy of the large data object, and without requiring creation of a copy of the associated small data object, and for uniquely associating the generated header with one segment of small data objects; and means for discontiguously passing said plurality of relatively small data objects and said plurality of associated headers from one layer in said communications stack to a second layer in said communications stack, whereby each of said plurality of small data objects may be passed to said second layer in said communications stack discontiguously from its associated header and without requiring physical movement of any of the small data objects and its associated header and without requiring creation of a copy of any of the small data objects and its associated header.

8. A system for managing processing of a relatively large data object in a communications stack according to claim 7 wherein said means for discontiguously passing comprises:

means for generating a buffer list for each small data object segment created by said segmenting means, said buffer list being uniquely associated with a small data object segment and the header corresponding to the small data object segment; and means for passing each buffer list from one layer in said communications stack to a second layer in said communications stack, whereby each of said plurality of small data objects may be passed to said second layer in said communications stack discontiguously from its associated header and without requiring physical movement of any of the small data objects and its associated header and without requiring creation of a copy of any of the small data objects and its associated header.

9. A system for managing processing of a relatively large data object in a communications stack according to claim 8 wherein said means for generating a buffer list comprises:

means for generating a primary token for representing the relatively large data object, said primary token being uniquely associated with the corresponding large data object;

means for generating a secondary token for representing a logical image of each small data object segment, each secondary token being uniquely associated with a corresponding small data object segment;

means for generating a header pointer for referencing a header associated with a particular small data object segment, each header pointer uniquely referencing the header corresponding to the particular small data object segment;

means for storing the primary token in each separate buffer list;

means for storing each secondary token in a separate buffer list, each buffer list corresponding to the same small data object segment to which the secondary token corresponds; and means for storing each header pointer in the separate buffer list having the secondary token stored therein which corresponds to the same small data object segment to which the header uniquely referenced by the header pointer corresponds.

10. A system for managing processing of relatively large data objects in a communications stack according to claim 7 further comprising means for receiving the relatively large data object from an application processing in said communications stack without receiving any information relating to the relationship between the relatively large data object and segmentation requirements of the communications stack.

11. A system for managing processing of relatively large data objects in a communications stack according to claim 7 further comprising:

means for discontiguously receiving the plurality of small data object segments at the second layer in said communications stack;

means for segmenting each of said received small data object segments into a plurality of smaller data object segments without requiring physical movement of the received small data object segments and without requiring creation of a copy of the received small data object segments, each smaller data object segment being relatively smaller in size than the received small data object segment from which it was segmented;

means for generating a smaller data object header containing protocol specific information for each smaller data object segment such that each smaller data object header is uniquely associated with one smaller data object segment, without requiring physical movement of the smaller data object segment and without requiring creation of a copy of the smaller data object segment; and means for discontiguously passing said plurality of smaller data object segments and said plurality of associated smaller data object headers from the second layer in said communications stack to a third layer in said communications stack, whereby each of said plurality of smaller data object segments is passed to said third layer in said communications stack discontiguously from its associated smaller data object header and without requiring physical movement of any of the smaller data object segments and its associated smaller data object header and without requiring creation of a copy of any of the smaller data object segments and its associated smaller data object header.

12. A system for managing processing of relatively large data objects according to claim 7 wherein said communications stack is a communications stack implemented in a virtual telecommunications access method (VTAM) system.

13. A computer program product for managing processing of a relatively large data object in a communications stack having multiple layers, said communications stack generally requiring segmentation of the relatively large data object as the large data object proceeds through the layers of said communications stack and appendage of headers containing protocol specific information to each segment of data, said computer program product comprising:

a computer readable storage medium having computer readable code means embodied in said medium, said computer readable code means comprising:

computer instruction means for segmenting said relatively large data object into a plurality of relatively small data objects without requiring physical movement of the relatively large data object and without requiring creation of a copy of the large data object;

computer instruction means for generating a header containing protocol specific information for each segment of relatively small data objects without requiring physical movement of the small data object, without requiring creation of a copy of the large data object, and without requiring creation of a copy of the associated small data object, and for uniquely associating the generated header with one segment of small data objects; and computer instruction means for discontiguously passing said plurality of relatively small data objects and said plurality of associated headers from one layer in said communications stack to a second layer in said communications stack, whereby each of said plurality of small data objects may be passed to said second layer in said communications stack discontiguously from its associated header and without requiring physical movement of any of the small data objects and its associated header and without requiring creation of a copy of any of the small data objects and its associated header.

14. A computer program product for managing processing of a relatively large data object in a communications stack according to claim 13 wherein said computer instruction means for discontiguously passing comprises:

computer instruction means for generating a buffer list for each small data object segment created by said computer instruction means for segmenting, said buffer list being uniquely associated with a small data object segment and the header corresponding to the small data object segment; and computer instruction means for passing each buffer list from one layer in said communications stack to a second layer in said communications stack, whereby each of said plurality of small data objects may be passed to said second layer in said communications stack discontiguously from its associated header and without requiring physical movement of any of the small data objects and its associated header and without requiring creation of a copy of any of the small data objects and its associated header.

15. A computer program product for managing processing of a relatively large data object in a communications stack according to claim 14 wherein computer instruction means for generating a buffer list comprises:

computer instruction means for generating a primary token for representing the relatively large data object, said primary token being uniquely associated with the corresponding large data object;

computer instruction means for generating a secondary token for representing a logical image of each small data object segment, each secondary token being uniquely associated with a corresponding small data object segment;

computer instruction means for generating a header pointer for referencing a header associated with a particular small data object segment, each header pointer uniquely referencing the header corresponding to the particular small data object segment;

computer instruction means for storing the primary token in each separate buffer list;

computer instruction means for storing each secondary token in a separate buffer list, each buffer list corresponding to the same small data object segment to which the secondary token corresponds; and computer instruction means for storing each header pointer in the separate buffer list having the secondary token stored therein which corresponds to the same small data object segment to which the header uniquely referenced by the header pointer corresponds.

16. A computer program product for managing processing of relatively large data objects in a communications stack according to claim 13 further comprising computer instruction means for receiving the relatively large data object from an application processing in said communications stack without receiving any information relating to the relationship between the relatively large data object and segmentation requirements of the communications stack.

17. A computer program product for managing processing of relatively large data objects in a communications stack according to claim 13 further comprising:

computer instruction means for discontiguously receiving the plurality of small data object segments at the second layer in said communications stack;

computer instruction means for segmenting each of said received small data object segments into a plurality of smaller data object segments without requiring physical movement of the received small data object segments and without requiring creation of a copy of the received small data object segments, each smaller data object segment being relatively smaller in size than the received small data object segment from which it was segmented;

computer instruction means for generating a smaller data object header containing protocol specific information for each smaller data object segment such that each smaller data object header is uniquely associated with one smaller data object segment, without requiring physical movement of the smaller data object segment and without requiring creation of a copy of the smaller data object segment; and computer instruction means for discontiguously passing said plurality of smaller data object segments and said plurality of associated smaller data object headers from the second layer in said communications stack to a third layer in said communications stack, whereby each of said plurality of smaller data object segments is passed to said third layer in said communications stack discontiguously from its associated smaller data object header and without requiring physical movement of any of the smaller data object segments and its associated smaller data object header and without requiring creation of a copy of any of the smaller data object segments and its associated smaller data object header.

18. A computer program product for managing processing of relatively large data objects according to claim 13 wherein said communications stack is a communications stack implemented in a virtual telecommunications access method (VTAM) system.

* * * * *